(12) United States Patent  
Singer et al.

(10) Patent No.: US 12,123,976 B2  
(45) Date of Patent: Oct. 22, 2024

(54) LASER SCANNER

(71) Applicants: LEICA GEOSYSTEMS AG, Heerbrugg (CH); HEXAGON TECHNOLOGY CENTER GMBH, Heerbrugg (CH)

(72) Inventors: Julien Singer, Altstätten (CH); Lukas Heinzle, Dornbirn (AT); Jochen Scheja, Hohenems (AT); Simon Mark, Thal (CH); Jürg Hinderling, Marbach (CH); Burkhard Böckem, Jonen AG (CH)

(73) Assignees: LEICA GEOSYSTEMS AG, Heerbrugg (CH); HEXAGON TECHNOLOGY CENTER GMBH, Heerbrugg (CH)

( * ) Notice: Subject to any disclaimer, the term of this patent is extended or adjusted under 35 U.S.C. 154(b) by 1062 days.

(21) Appl. No.: 16/138,847

(22) Filed: Sep. 21, 2018

(65) Prior Publication Data

US 2019/0094345 A1 Mar. 28, 2019

(30) Foreign Application Priority Data

Sep. 25, 2017 (EP) .................... 17193009

(51) Int. Cl.
*G01S 7/481* (2006.01)
*G01S 7/484* (2006.01)
(Continued)

(52) U.S. Cl.
CPC .......... *G01S 7/4817* (2013.01); *G01S 7/4813* (2013.01); *G01S 7/4815* (2013.01); *G01S 7/484* (2013.01);
(Continued)

(58) Field of Classification Search
CPC .... G01S 7/4817; G01S 7/4813; G01S 7/4815; G01S 7/484; G01S 17/42; G01S 17/931; G01S 7/499; G01S 17/89
See application file for complete search history.

(56) References Cited

U.S. PATENT DOCUMENTS 6,114,712 A 9/2000 Dvorkis et al.
7,544,945 B2 * 6/2009 Tan .................... G01S 17/87
250/353
(Continued)

FOREIGN PATENT DOCUMENTS

CN 1242556 A 1/2000
CN 104081156 A 10/2014
(Continued)

OTHER PUBLICATIONS

English DE-102014118055-A1 (Year: 2016).*
(Continued)

*Primary Examiner* — Yuqing Xiao
*Assistant Examiner* — Jempson Noel
(74) *Attorney, Agent, or Firm* — Maschoff Brennan (57) ABSTRACT

A laser scanner device can be adapted to be mounted to a vehicle, the device comprising a LiDAR module working based on a laser measuring beam and time-of-flight-measurement-principle. The LiDAR module is configured to provide a horizontal field of view of at least 60°, an instantaneous vertical field of view of at least ±2°, a scan resolution of at least one point per 0.8° in horizontal and vertical direction, and a frame rate of at least 10 Hz for scanning at least the entire horizontal and instantaneous vertical field of view with said scan resolution, wherein the LiDAR module comprises a multibeam transmitter configured for generating a plurality of measuring beams.

16 Claims, 5 Drawing Sheets

(51) Int. Cl.
*G01S 7/499* (2006.01)
*G01S 17/42* (2006.01)
*G01S 17/931* (2020.01)

(52) U.S. Cl.
CPC ............ *G01S 17/42* (2013.01); *G01S 17/931* (2020.01); *G01S 7/499* (2013.01)

(56) References Cited

U.S. PATENT DOCUMENTS

| | | | |
|---|---|---|---|
| 8,836,922 B1* | 9/2014 | Pennecot | G01S 17/42 356/9 |
| 9,267,787 B2 | 2/2016 | Shpunt et al. | |
| 9,557,585 B1 | 1/2017 | Yap et al. | |
| 9,594,381 B1* | 3/2017 | Clark | E04H 15/50 |
| 9,658,059 B2 | 5/2017 | Metzler et al. | |
| 2007/0181810 A1 | 8/2007 | Tan et al. | |
| 2011/0216304 A1* | 9/2011 | Hall | G01S 7/4813 356/4.01 |
| 2012/0292481 A1* | 11/2012 | Hutchin | H01L 27/14629 250/214 R |
| 2014/0307252 A1* | 10/2014 | Hinderling | G01C 15/006 356/141.2 |
| 2014/0336848 A1* | 11/2014 | Saund | G06V 20/13 701/3 |
| 2015/0055117 A1 | 2/2015 | Pennecot et al. | |
| 2016/0003946 A1* | 1/2016 | Gilliland | G01S 17/10 356/5.01 |
| 2016/0047900 A1* | 2/2016 | Dussan | G01S 17/87 356/4.01 |
| 2016/0146941 A1 | 5/2016 | Hassenpflug et al. | |
| 2016/0282449 A1 | 9/2016 | Slobodyanyuk | |
| 2016/0282453 A1 | 9/2016 | Pennecot | |
| 2017/0003392 A1* | 1/2017 | Bartlett | G01S 17/10 |
| 2017/0082735 A1 | 3/2017 | Slobodyanyuk et al. | |
| 2017/0090481 A1* | 3/2017 | Clark | E04H 15/50 |
| 2017/0176579 A1 | 6/2017 | Niclass et al. | |
| 2017/0307736 A1* | 10/2017 | Donovan | G01S 7/499 |
| 2018/0217240 A1* | 8/2018 | Qiu | G01S 7/4816 |
| 2018/0222581 A1* | 8/2018 | Nagasawa | G01M 3/38 |
| 2018/0299534 A1* | 10/2018 | LaChapelle | H04N 5/232 |
| 2019/0353787 A1* | 11/2019 | Petit | G01S 7/484 |

FOREIGN PATENT DOCUMENTS

| | | |
|---|---|---|
| CN | 105143820 A | 12/2015 |
| DE | 101 51 982 A1 | 4/2003 |
| DE | 10 2014 223900 A1 | 5/2016 |
| DE | 102014118055 A1 * | 6/2016 |
| DE | 10 2015 112297 A1 | 2/2017 |
| DE | 10 2016 009926 A1 | 2/2017 |
| EP | 1 239 300 A2 | 9/2002 |
| EP | 1 832 897 B1 | 11/2010 |
| KR | 2016-0147140 A | 12/2016 |

OTHER PUBLICATIONS

Extended European Search Report dated Mar. 21, 2018 as received in Application No. 17193009.2.
Ibeo: "Ibeo LUX 8L", Retrieved from the Internet: URL: http://www.magus.co.kr/main/download_file.php?proidx=37&file type=1, pp. 2 (Sep. 1, 2013).
Kim, Z., et al., "A hybrid 3D LIDAR imager based on pixel-by-pixel scanning and DS-OCDMA," Proc. SPIE 9751, Smart Photonic and Optoelectronic Integrated Circuits XVIII, vol. 9751, pp. 975119-975119 (Mar. 2, 2016).
Schneider, A., et al., "Sensor study for high speed autonomous operations," Proc. SPIE 9494, Next-Generation Robotics II; and Machine Intelligence and Bio-inspired Computation: Theory and Applications IX, vol. 9494, pp. 2-10 (Jun. 18, 2015).
Excelitas: "Preliminary Datasheet Photon Detection Surface Mount 905nm Pulsed Semiconductor Laser 4-channe; Array High Power Laser-Diode Family for LiDar and Range Finding", Jul. 12, 2017, pp. 1-8.

* cited by examiner

LASER SCANNER

CROSS-REFERENCE TO RELATED APPLICATIONS

This application claims priority to European Patent Application No. 17193009.2 filed on Sep. 25, 2017, which is incorporated herein by reference.

FIELD OF THE INVENTION

The present invention pertains to a laser scanner device having a LiDAR (light detection and ranging) module working based on TOF-WFD (time-of-flight waveform digitizing).

BACKGROUND

LiDAR modules working based on TOF-WFD are well known in the art, and implemented e.g. within the ScanStations P20, P30 and P40 of Leica Geosystems.

For running autonomous cars, it is preferred to have the roads be thoroughly mapped in advance. This can be done by special cars that have some kind of scanner device to scan and map the respective area.

For use on such a car for mapping the road, the LiDAR module has special requirements with respect to the scanning field-of-view (FOV) combined with a high frame rate. The horizontal field-of-view (HFOV) should be about 80°, whereas the vertical field-of-view (VFOV) can be considerably smaller (about ±25°). Also defined is an instantaneous vertical field-of-view (iVFOV) which is scanned by a very high speed such that the point recording measurement rate is beyond 1 Megapoint per second. Within the angular span HFOV×iFOV the measurement frame rate is typically periodical. An instantaneous vertical field-of-view (iVFOV) needs only to be about ±5°. The frame rate for scanning this FOV should be at least 25 Hz. To adjust for this special request, new components and technology platforms are necessary.

In principle, such LiDAR modules are designed, for example, with an electro-optical laser-based distance meter in order to detect a distance to an object point as a measuring point, wherein a deflection element may be present to vary the measuring direction of the laser distance measuring beam, e.g. with respect to one or several independent spatial directions, whereby a spatial measuring or scanning area can be captured.

By way of example, a deflecting unit may be realized in the form of a moving mirror or alternatively also by other elements suitable for the controlled angular deflection of optical radiation, such as rotatable reflective or transparent prisms, moving optical fibers, refractive optical elements, deformable optical components, etc. The measurement usually takes place with the determination of distance and angles, that is to say in spherical coordinates, which can also be transformed into Cartesian coordinates for display and further processing.

In particular, a LiDAR module can have separate beam paths, i.e. one for the transmitted radiation and one for the receiving beam, or the beam paths of the transmitting channel and of the receiving channel can at least partially overlap. In particular, the beam paths can thus be configured in such a way that a deflection unit acts only on the transmitted radiation, i.e. wherein the imaging effect of the reception channel is independent of the control of a beam deflecting element of the deflecting unit. By way of another example, the transmission channel and the reception channel may each have their own deflection unit which can be controlled separately, or a single deflecting unit may act both on the transmitted radiation and on the receiving radiation.

Various principles and methods are known in the field of electronic or electro-optical distance measurement. One approach is to emit pulsed electro-magnetic radiation, e.g. laser light, to a target to be measured and to subsequently receive an echo from this target as a back-scattering object, wherein the distance to the target to be measured can be determined by the time-of-flight (ToF), the shape, and/or the phase of the pulse. Such laser distance meters have now become standard solutions in many areas.

For the detection of the returning pulse or a returning pulse sequence, two different approaches or a combination thereof are usually used.

In the so-called threshold method, a light pulse is detected when the intensity of the radiation incident on a detector of the distance measuring device exceeds a certain threshold value. This threshold prevents noise and interference signals from the background being confused as measuring signal. However, in the case of weak return pulses, e.g. caused by larger measuring distances, detection of measuring signals is no longer possible as soon as the pulse intensity is below the set detection threshold. Thus, the essential disadvantage of this threshold method is that the amplitude of the measurement signal must be sufficiently larger than the amplitude of optical and electrical noise sources in the signal path. Therefore, in order to sufficiently minimize misdetections, it may be required to set the threshold to a certain level wherefore measurements may only be applicable at certain conditions.

The other approach is based on sampling the returning pulse. This approach is typically used for weak backscattered signals (e.g. pulse signals). This method may also be regarded as holistic signal acquisition, wherein the complete measuring signal as well as the essential noise information is determined, which leads to an increase in measuring accuracy. An emitted signal is detected by sampling detector data associated to radiation detected by a detector, identifying a signal within the sampled data, and finally by determining a return time of the signal. By using a multiplicity of sampling values and/or by synchronous summation of the detector data with respect to the emission rate, a useful signal can also be identified under unfavorable circumstances, so that measuring over even greater distances or noisy or interference-prone background scenarios becomes possible.

For example, often the entire waveform of the analog signal of the radiation detected by a detector is sampled by means of the so-called wave form digitizing method (WFD). After identification of the coding of the associated transmission signal (ASK, FSK, PSK, also known as distance or interval modulation, etc.) of a received signal a very precise signal propagation time ("pulse propagation time", ToF) is determined, e.g. by means of the Fourier transformation or based on a defined path point of the sampled, digitized and reconstructed signal path, such as the turning points, curve maxima, or integrally by means of an optimum filter known from the time interpolation.

As an alternative or in addition to the determination of the pulse propagation time, a (fast) sampling often also takes place with respect to pulses or pulse sequences encoded or modulated in amplitude, phase, polarization, and/or wavelength (frequency).

For example, the electrical signal generated by the detector is converted into a digital signal sequence by means of an analog-to-digital converter (ADC). This digital signal is then processed substantially in real time. In a first step, the signal sequence is decoded, i.e. identified, by special digital filters (ASK, FSK, PSK, etc.), and finally the position of a signature describing a time interval within the signal sequence is determined. Examples of time-resolving signatures are center of gravity, sine-cosine transformation, or amplitude-defined FIR filters ("finite impulse response filter") with a weight coefficient derived from the pulse shape. In order to eliminate any distance drift a corresponding time-resolved signature may also be compared with an internal start signal. In order to avoid irreversible sampling errors, additional digital signal transformations known to one skilled in the art may be used.

One of the simplest modulation modes is the marking of the individual pulses or the pulse sequences by distance coding, e.g. as described by EP 1 832 897 B1, which may be used for the purpose of re-identifiability. This recognition is necessary when an ambiguity arises which may be caused by different scenarios occurring during a time-of-flight of pulses, e.g. if there is more than one pulse or a pulse group between the measuring device and the target object.

SUMMARY

In some embodiments, the technology provides an improved LiDAR scanner device.

In some embodiments, the technology provides a device which fulfils the requirements stated above, in particular wherein the LiDAR scanner device is useable in autonomous cars, vans, trains, trolleys, robots, or other moving vehicles.

In some embodiments, the technology provides a laser scanner device in accordance with embodiments described herein.

In some embodiments, the technology provides a laser scanner device adapted to be mounted to a vehicle, the device comprising a LiDAR module working based on a laser measuring beam and time-of-flight-measurement-principle, in particular using the technology of waveform digitizing.

In some embodiments, the technology provides a LiDAR module that comprises a multibeam transmitter configured for generating a plurality of measuring beams, particularly pulsed laser beams, defining a plurality of essentially instantaneous scanning axes, and the LiDAR module comprises a receiver for detecting returning parts of the measuring beams, in the following called back radiation, wherein the lidar module is configured to determine a set of return signals based on the back radiation, each return signal corresponding to a different measuring beam. The LiDAR module further has a common exit optics configured for collimating all measuring beams, particularly wherein the common exit optics is at the same time configured as first optical element of a receiving optical channel for capturing the back radiation.

In some embodiments, the LiDAR module is configured to provide a horizontal field of view of at least 60°, particularly a horizontal field of view between 60° and 180°, an instantaneous vertical field of view of at least ±2°, a scan resolution of at least one point per 0.8° in horizontal and vertical direction, and a frame rate of at least 10 Hz for scanning at least the entire horizontal and instantaneous vertical field of view with said scan resolution.

In some embodiments, multi-beam laser scanners have several advantages, e.g. achieving a higher point rate or a higher point density, e.g. with a slower rotation speed of a rotating beam deflection mirror. Furthermore, less moving components are required and a more compact design may be enabled. However, individually emitted beams have to be aligned in each case to associated reception areas, wherein crosstalk between individual beams, e.g. wherein a specific reception area associated to a first beam detects light of a second beam sent out close to the first beam, may limit the capability of multi-beam measurements.

Therefore, pulse or pulse group coding may be particularly useful in multibeam systems, wherein scanning data is acquired by generating a plurality of beams for scanning at the same time.

For example, a multi-beam LiDAR module may be embodied to generate multiple individual measuring beams next to each other, each beam having a small divergence angle, instead of a single measuring beam which has to be deflected in a temporally varying manner in order to scan the area captured essentially instantaneously by the multiple measuring beams. Individual beams may be sent out as a diverging or converging set of beams, e.g. arranged in a common plane (diverging line laser/strip laser/fan laser) or arranged such that they generate a cone of individual beams. Alternatively, individual beams may be sent out parallel to each other.

By way of example, the device can be configured to have at least one of a horizontal field of view of at least 70°, in particular at least 80°, an instantaneous vertical field of view of at least ±2°, in particular at least ±5°, a scan resolution of at least one point per 0.5° in horizontal and vertical direction, in particular one point per 0.3°, and a frame rate of at least 20 Hz, particularly at least 25 Hz, for scanning at least the entire horizontal and instantaneous vertical field of view with said scan resolution.

In some embodiments, the transmitter comprises a radiation source, and a multibeam generator for generating the plurality of measuring beams based on radiation emitted by the radiation source, particularly based on at least one of a holographic structure, a liquid crystal spatial modulator, and an optical phased array.

In further embodiments, the multibeam generator is configured that the plurality of measuring beams are generated to form an essentially instantaneous 1D or 2D scan pattern.

For example, by using holographic structures the number of transmitters may be reduced, e.g. by using holographic structures, a diffractive optical beamsplitter, and a single transmitter in the beam forming process. Therefore, instead of using a diode for each beam (and wavelength), a hologram may be used.

For example, if radiation sources of different wavelength are used, a hologram may be illuminated for each wavelength by a separate laser. Because of the multiplication factor of beams projected by the hologram, groups of beams of the same wavelength are generated. The beam groups are mixed in the monitored zone so that there is no overlap of projected beams of the same group/wavelength in the monitored zone.

Furthermore, it is also possible to differentiate between the channels by additional matters, e.g. by code sequences, wherein the first group of beams is linked to a first diode emitting a first code, and a second group is linked to a second diode emitting a second code. In the monitored zone, physically, the beams of a group are not located together but mixed with the beams of the other groups. The group of beams can however emanate from a similar local region/from a single hologram. The orientation of the beams is then chosen so as to achieve the correct mixing of the beam alignments in the monitored zone or using multiple wavelengths.

By way of another example, multi-color back reflections, of which the beams are emitted by an apparently similar source or source direction, originating from the same or overlapping target area can be split at the receiver using for instance prisms or holographic dispersers or splitters. Using the hologram, cost and size of the transmitters may be reduced while maintaining the channel separation. In a distributed system concept in which the emitted beams surround the receiving optics, light guides/light fibers are used to deliver the beams emanating from a diode to the target hologram, e.g. arranged around a deflecting mirror.

By way of another example, using a holographic grating, a (divergent) point source can be used to generate a collimated beam. By using multiple collimated beams with different inter beam orientation and spacing as the object source during hologram creation, multiple collimated object beams are reconstructed from a single point source, wherein the lateral position and inter orientation of the beams is determined during the creation of the hologram. When selectively using multiple holograms, each created with different lateral spacing and/or varying inter orientation of the beams and/or varying divergence of each beam, multiple emission patterns can be projected. These multiple holograms can be implemented on one common optical plate and be selectively moved into the primary laser beam. Alternatively these holographic structures can be generated by a single spatial phase modulator operated by an electrical control signal.

Re-creating (collimated) beams through the hologram makes it possible to collimate the beams without additional optical elements and holders therefore, wherein placing a light source at a different position (angle) compared to the position at the time of creation of the hologram creates a reconstructed beam at a different wavelength.

According to another embodiment, the radiation source is a 1D or 2D emitter array, particularly a single bar or multiple staked bars of laser diodes.

By way of example, the emitter array may be configured to provide selectively controllable laser diodes.

For instance, the collimation of the VCSEL array into a singular beam can be accomplished by a microlens array on wafer scale as a light gathering and pre-collimation lens array combined with a macroscopic lens.

A compact setup of a light source can be achieved by an array of laser diodes on a bar-like semiconductor substrate, wherein the emission points are aligned in a line. The lasers may be selectively activated and thus all kinds of spatial patterns are possible. For example, the odd or even lasers in the bar can be activated alternatively such that optical cross-talk between neighbouring channels does not exist. Such array-structures allow a very high degree of integration, especially when the laser diode array and its electronic driver circuitry are implemented on one electronic chip.

Another embodiment is characterized in that the plurality of measuring beams are generated such that within the plurality of measuring beams each measuring beam is identifiable by a corresponding beam identifier based on at least one of the beam wavelength, the polarization state of the beam, and a pulse coding, in particular wherein at least two beams of the plurality of measuring beams have orthogonal pulse codings, particularly based on barker pulses.

Thus, to reduce optical cross talk, multiple laser diodes may be used wherein each laser diode may use a separate wavelength, or, in order to limit the amount of different components, two or more wavelengths may be used in such a manner as the wavelength alternates such that at least adjacent laser beams have a different wavelength.

The use of multiple polarization states/multiple polarizers is a further method to differentiate between multiple beams emitted at the same time. However, the generally uncontrolled incident angles of a scanner scanning an unknown environment often introduces ambiguity because changes of the polarization state of the incident beam can happen depending on the angle of incidence and the material of the scanned object.

A further way to reduce cross-talk is the serial or interleaved modulation of an array of laser diodes, wherein by doing this, neighbouring beams are separated in time.

An additional measure to reduce crosstalk influence is by sending coded pulses. Depending on the number of transmitters, the allowable eye-safety limits, and the desired range, each individual transmitter can have a separate unique code. In order to reduce the number of unique codes, the coded pulses are sent in such a way that adjacent transmitters send orthogonal pulses. For example, when using barker pulses, the extended pulse length does not affect the sharpness of the correlation peak when compared with sending of a single pulse. Barker pulses may also be beneficial in cases where the eye safety would allow for more laser power, whereas the peak power of the laser diode is at its limit. In such a case sending multiple pulses, for instance barker pulses, can result in a better channel separation and an increased signal-to-noise ratio (S/N).

In a further embodiment, the plurality of measuring beams are generated such that its beams are identifiable as a group having a common group identifier based on at least one of a common group wavelength or a range of wavelengths assigned to the group, a common polarization state of the group or a range of polarization states assigned to the group, and a common pulse coding for the group or a range of pulse codings assigned to the group.

Therefore, in a system comprising multiple vehicles wherein each vehicle is equipped with an inventive laser scanner device, each laser scanner device can unambiguously identify its own laser beams, i.e. to prevent the risk that a LiDAR module of a first vehicle misinterprets radiation associated to a second vehicle as its own, which would lead to wrong measurements.

Another embodiment relates to a laser scanner device wherein the LiDAR module is configured for deflecting the plurality of measuring beams emitted by the transmitter in a temporally varying manner.

For example, the LiDAR module comprises at least one of a horizontal deflecting unit configured for steering the plurality of measuring beams horizontally, based on at least one of a rotating mirror, a microelectromechanical system, and a galvano, in particular for deflecting the plurality of measuring beams in a uniform manner, and a vertical deflecting unit configured for steering the plurality of measuring beams vertically in the instantaneous vertical field of view, based on at least one of a polygon prism, a mirror, and a microelectromechanical system.

In another embodiment, the laser scanner device has a tilt mechanism for tilting the LiDAR module to achieve an extended overall vertical field of view of at least ±25°.

In a particular embodiment, the receiver has an opto-electronical sensor based on an arrangement of a multitude of microcells, particularly wherein the sensor is configured as an array of single photon avalanche photodiodes, e.g. a SPAD-array operated in overbreak mode.

By way of example, the sensor may be configured such that the microcells can be read out individually or in groups of microcells, such that sub-areas of the sensor are set which are read out separately, and the LiDAR module comprises a computing unit, wherein the receiver and the computing unit are configured that different sub-areas of the receiver are set by the computing unit, namely in such a way that returning parts of different measuring beams in each case are read out by different sub-areas of the receiver, particularly based on angle and/or distance data corresponding to individual measuring beams of the plurality of measuring beams.

In the case wherein the plurality of measuring beams are deflected in a temporally varying manner, for example, the computing unit may be configured to control the LiDAR module based on a pre-programmed measuring process to drive the emission and/or the deflecting of the plurality of measuring beams and the setting of sub-areas of the receiver, wherein the setting of sub-areas is synchronized with the emission and/or the deflecting of the plurality of measuring beams, particularly based on angle data corresponding to the deflecting of the plurality of measuring beams.

For example, arrays of single photon avalanche photodiodes, in the following called SPAD arrays, are usually arranged as a matrix structure on a chip. The devices or chips with a photosensitivity in the visible and near infrared spectral range are also referred to as SiPM (Silicon Photomultiplier). The SiPM gradually replace the photomultiplier tubes used hitherto, in particular in the visible and near ultraviolet spectral range. SiPM have a high spectral sensitivity in the visible wavelength range. For example, silicon-based SPAD arrays produced in CMOS technology are available, which are sensitive up to the near-infrared range beyond a wavelength of 900 nm.

Commercial SPAD arrays are also available at wavelengths between 800 nm and 1800 nm. These sensors mainly consist of the InGaAs semiconductor material. Depending on the design, these sensors also have an external or internal matrix structure over the photo-sensitive surface. Distance measuring systems with SPAD arrays in this spectral range have the advantage that the solar backlight (daylight) is significantly lower than the visible wavelength range and that this disturbing luminous flux is less detrimental to the SPAD arrays.

The special feature of these SPAD array sensors is their very high photosensitivity, whereby the SPAD arrays are mainly designed to detect single photons without problems. Therefore, they are also referred to as "multipixel photon counters" (MPPC). The SPAD arrays consist of hundreds, thousands, and tens of thousands of microcells and are capable of simultaneously receiving pulses with thousands or hundreds of thousands of photons. In addition, due to the parallel connection of the many microcells into cell groups (domains), sufficient cells are still available for detecting the signal photons even in the case of solar background light.

A further special feature of SPAD arrays is that individual microcells or individual subsets of microcells can be separately controlled and/or separately read out. The microcells can thus be activated locally sequentially, e.g. for a line- or column-wise readout of the receiver (for example as a "rolling shutter" or "rolling frame").

In particular, subsets of microcells may be defined by a group of adjacent microcells, or the subregions may be defined by spaced-apart regions of the receiver, i.e. such that the individual subregions are defined by separate unconnected spatial groups of microcells. For example, if a subset of microcells is activated locally in a sequential manner then a "rolling frame" or "window" is virtually shifted synchronously to the moving laser spot on the detector surface.

Therefore, by using a SPAD array with individually addressable microcells, the active region of the SPAD array can be configured to match the selected alignment of an associated beam of the multiple measuring beams of the inventive laser scanner device. Thus, the individual microcells of the SPAD array are grouped/selected so as to match the selected alignment/shape of the individual beams.

By way of example, a high degree of integration can be achieved when both the laser unit consists of an integrated array of emitters as well as the receiver comprises a SPAD array or an array of SPAD arrays, which are activated and synchronized to each other creating a virtual time sequential scan over the scene to be mapped.

In addition, a time sequence of signal capturing may be generated in that individual microcells or microcell groups (domains) of the SPAD array are alternately led to the output, e.g. by alternating even and odd lines of the SPAD array. Such a time-alternating activation of microcells or microcell groups shortens the recovery time of the SPAD array, whereby a faster laser modulation or pulse shooting rate can be achieved.

Instead of activating the microcells or microcell groups (domains) of the SPAD array, they can remain activated in a stationary state, for capturing and evaluating the output of the microcells or domains synchronously to a scanning movement. In this case, the microcells or microcell groups (domains) are directly connected to the signal output, which are aligned in time-synchronous manner with respect to the surface of the object, by means of an electronic circuit, for example integrated on the SPAD array.

The respectively active FoV of the receiver is designed so small in the angular range that the backscattered receiving pulses can be completely viewed and received and, as little as possible, disturbing ambient light is received.

In the literature a distinction is made between SPAD array operations in linear mode, Geiger mode and SPL mode (SPL, "Single Photon LiDAR").

In the linear mode below the breakdown voltage, a gain occurs which depends on a blocking voltage and temperature, wherein SPAD arrays in linear mode can be used for the construction of a high-sensitivity photoelectric receiver with an output voltage proportional to the radiation input.

In Geiger mode and SPL mode, i.e. in operation above the breakdown voltage a SPAD or a SPAD array detector can be used for single photon counting. In a SPAD in Geiger mode, each individual pixel generates an output signal, whereby the electron avalanche is triggered by exactly one photon. If a photon packet consists of several photons, then no larger signal is measured. Therefore, no amplitude information is available.

In the Geiger mode, an incident photon packet produces only a (binary) event signal, which is not proportional to the amount of photons in the photon packet.

SPL mode is a SPAD array operated in Geiger mode where many microcells are connected in parallel to an output signal. In the case of incoming photon packets with only a few photons, the individual avalanches add up virtually linearly and the amplitude of the output signal is therefore proportional or at least monotonically increasing to the number of detected photons.

The recovery time of the microcells after a photonic trigger is not zero but, for example, between 5-50 nanoseconds, which reduces the apparent sensitivity of the SPAD array for subsequent photons. However, this has the advantage, for example, that the sensor can detect a signal strength range with high dynamics. For SPAD arrays with a large number of microcells (>1000) this non-linearity is monotonic and, on the one hand, leads to an amplitude compression between the input signal and the output signal, and, on the other hand, with increasing input signal, to a weakened increasing output signal. Interestingly, the output signal of SPAD arrays with a high number of microcells (>1000) does not completely saturate so that an amplitude change can be measured even with a reception pulse with a very high photon number well over one million.

The laser signals of a distance measuring device are generally subjected to pulse coding. Typical pulse rates are in the kHz and the GHz range. Experiments have shown that such signals can be well received with SPAD arrays at voltages in the overbreak mode. Also pulse packets (bursts) can be received unambiguously and almost noise-free. For example this is also the case, when the recovery time of the microcells is quite long, e.g. ten nanoseconds. Due to the quasi-analogous construction of SPAD arrays, a photo current which is present due to ambient light is also received. The laser signal is then superimposed on the electrical photo current of the ambient light. For example, the current pulse generated by the laser pulse may be high-pass filtered at the output of the SPAD array, so that the slow falling edge signal is shortened. The output pulse thereby becomes a short signal pulse, e.g. with a pulse duration less than a nanosecond. Such short pulses with steep edges are suitable for precise time and distance measurements. However, the use of a high-pass filter (differentiator) does not affect the recovery time of the SPAD array.

Furthermore, initial implementation attempts have already been undertaken in order to integrate more electronic functionality into the SPAD arrays. By way of example, time-measuring circuits ("TOF-circuitries", TDC: "time to digital converter") assigned to each microcell are already used. These measure the runtime (TOF, "time-of-flight"). SPAD array implementations exist, for example, where precise photon counting is integrated in the vicinity of the microcells, which do not require a downstream analog-to-digital converter (ADC). In addition, a time-measuring circuit (TDC) may for example be integrated in each microcell. Further, a digital interface may be used as output of the SPAD array. For example, such devices are fully digital and do not need mixed signal processing during CMOS production.

By way of example, the receiver comprises multiple opto-electronical sensors, particularly multiple arrays of single photon avalanche photodiodes, wherein the multiple sensors are arranged in a one-dimensional or in a two-dimensional manner, in particular wherein each sensor has its own control and/or evaluation electronics.

For example, the individual sensors may be integrated into a single housing, forming an array of photo-active regions of which the orientation of the active region is linked to the transmitter through the optics. Such a receiver array may consist of a coherent two-dimensional array of detectors with regular equal and/or unequal spacing between the active elements constituting the array (so-called mega-array), wherein the alignment of the receiving array and the individual beams of the transmitter is made during the manufacturing process and can be dynamically changed depending on a chosen zoom, inter beam divergence, and the divergence of each individual beam.

The multi beam laser grid may be adjusted according to the vehicle's speed or the driving situation. For example, at low velocities, e.g. in cities, a broad area is scanned, whereas with high speed, e.g. on a highway, a narrow field will be scanned mainly in front of the car.

Further, the spot size (divergence) of each individual laser beam and the receiver may be adjusted. For example, on the highway the point density may be increased, wherein at the same time the spot sizes are decreased to increase the measurement range and prevent overlap. The required minimum reaction distance may also be increased, e.g. because the car cannot react fast enough for nearest obstacles. In cities a larger scan area is needed but with lower density and lower range. Thus, the spot sizes need to be increased to detect all obstacles.

In the same way like a dynamic bending light in a car the scan area could be modified according to the steering wheel position in order to scan the scene properly ahead in driving direction.

Thus, according to another embodiment, the LiDAR module is configured to set at least a first and a second scan pattern based on the plurality of measuring beams, the second scan pattern is different from the first scan pattern, and the LiDAR module is configured to alternate between the first and the second scan pattern based on at least one of the speed of the vehicle and directional information of the vehicle. For example, the directional information comprises at least one of a position of a steering wheel of the vehicle, particularly a sequence of steering wheel positions, e.g. wherein a change in path is derived from previous and current steering wheel positions, a vehicle path determined by GPS localization, and a vehicle orientation and/or a vehicle orientation change determined by an inertial measuring unit, particularly a change in heading direction and/or a change in vehicle tilt.

The first and the second scan pattern may differ from each other by at least one of a different laser power distribution within the beams, a different number of beams, a different projected beam density, a different projected beam distribution, a different beam spacing, a different emission timing, particularly a different pulse emission timing, and different individual beam shapes, particularly different divergence angles of individual beams.

It is also possible to adapt the scan area according to GPS position and navigation data. By way of example, when the vehicle comes near to a crossing the scan area is increased to be able to measure obstacles coming from the side.

Therefore, in a further embodiment, the LiDAR module is configured to alternate between the first and the second scan pattern based on a current global position of the vehicle, particularly based on GPS data and/or navigation data from the vehicle.

If the LiDAR module detects a signal of another device, e.g. from an oncoming car, the LiDAR modules may "communicate" with each other, wherein a first device sends a standardised pulsed signal into the direction of the oncoming device to tell the oncoming device to stop scanning into the direction of the first device. On the other way round, the first device may reduce the laser power in that local scan area in the direction of the oncoming device to prevent disturbance of that device.

The invention further relates to a system comprising a set of laser scanner devices as described above, wherein each laser scanner device has an associated unique identifier, and the laser scanner devices are configured to communicate their identifiers to each other, wherein each laser scanner device is configured to send a coded signal based on the plurality of measuring beams, the coded signal comprising the identifier of that laser scanner device, and each laser scanner device is configured to receive a coded signal from another laser scanner device of the set of laser scanner devices and to derive the identifier comprised in that received coded signal. The LiDAR module of each laser scanner device is configured to alternate between the first and the second scan pattern based on a received coded signal from another laser scanner device of the set of laser scanner devices.

BRIEF DESCRIPTION OF THE DRAWINGS

The invention of some of the embodiments will be explained in greater detail below with reference to examples of possible embodiments. Same elements in the figures are indicated by the same index numbers. It should be understood that the drawings are diagrammatic and schematic representations of such example embodiments and, accordingly, are not limiting the scope of the present invention, nor are the drawings necessarily drawn to scale. The drawings include.

DETAILED DESCRIPTION

Figure 1:
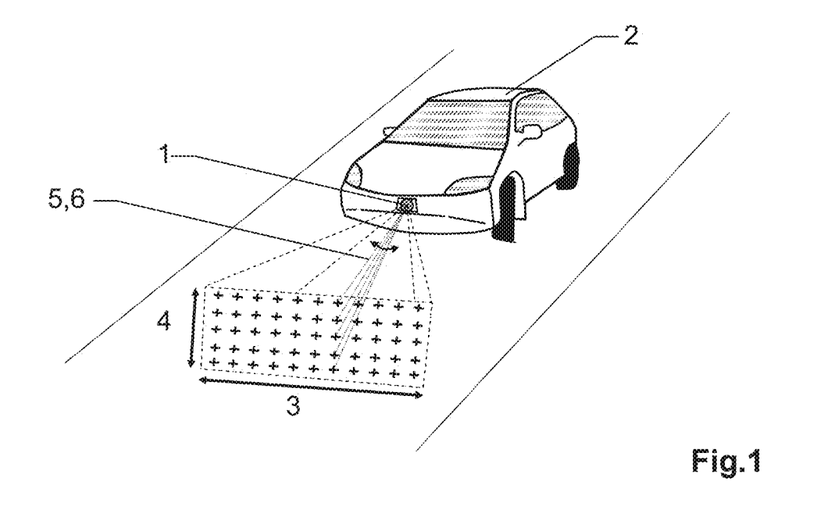
FIG. 1 schematically depicts the inventive multi-beam laser scanner device mounted to a vehicle in an autonomous car application.

FIG. 1 shows an application of the inventive laser scanner device 1 in the area of autonomously driving vehicles, wherein the roads to be driven are typically recorded in advance by a dedicated LiDAR module mounted on a vehicle 2 and the measurements are provided to a spatial model generator. In such a laser scanner 1 the horizontal field of view 3 (HFOV) is typically larger than the vertical field of view 4 (VFOV). A subsection of the VFOV is designated as the instantaneous field of view (iFOV), wherein the acquisition rate for the scanning of the complete field of view may for example be approximately 25 Hz.

Such systems typically require a robust and long-lasting design, whereby typically also a compact design is necessary, and, where possible, moving parts are omitted. Thus, often MOEMS components ("micro-opto-electro-mechanical system") or adjustable or deformable refractive optical elements, e.g. liquid lenses, are used as deflecting elements. By way of example, optical phased arrays consisting of ultra thin liquid crystal films or films using the electro-optical Pockels or Kerr-effect allow for high speed beam deflection and thus fast scanning of more than 1000 rad/sec. In accordance with these specifications, by way of example, the inventive use of a SPAD-array sensor has the advantage that the opto-mechanic design of the receiving channel may be further simplified.

According to the invention, the LiDAR module comprises a multibeam transmitter configured for generating a plurality of measuring beams 5, particularly pulsed laser beams, defining a plurality of essentially instantaneous scanning axes 6.

Thus, when using an array of measuring beams, a higher point rate or a higher point density may be achieved with a slower rotation speed of a rotating beam deflection mirror. Therefore, opto-mechanical requirements with regard to wear of individual components may be reduced, less moving components are required, and a more compact design may be enabled.

By way of example, a custom laser scanner mounted horizontally at a suitable height at the front of a car allows a qualitative analysis of range performance, accuracy, dynamic range (road-sign scans) and tarmac scans (low reflectivity at high ranges and low incident angles).

By way of another example, a common and compact housing to house all beam steering elements may be foreseen, e.g. wherein, conceptually, such an embodiment may be based on a fast rotating reflective or refractive polygon wheel projecting the instantaneous Field of View (iVFOV), and either a fixed rotating mirror or a dynamically rotating galvano projecting the horizontal field of view (HFOV).

Figure 2:
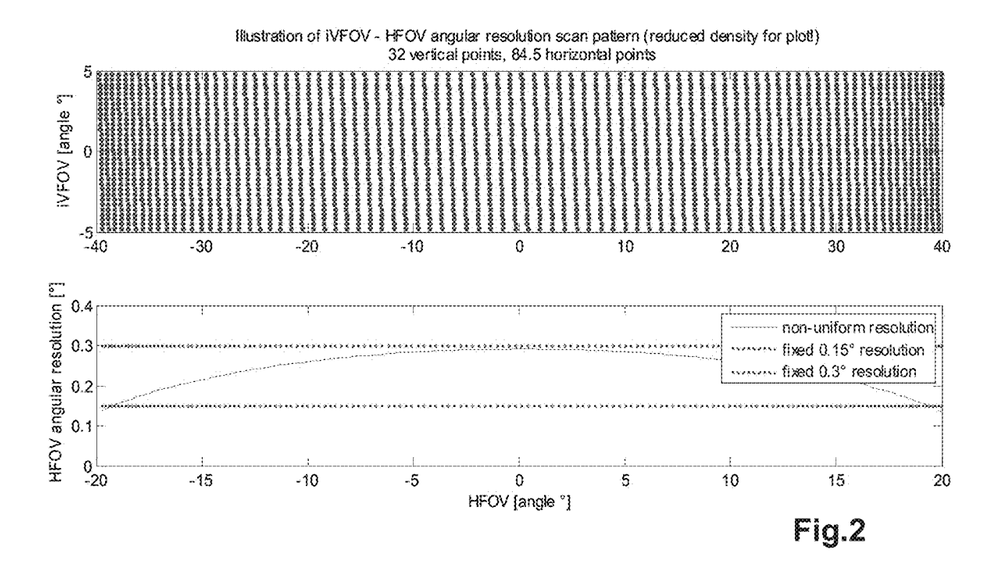
FIG. 2 shows a non-uniform point distribution in horizontal direction, e.g. for an embodiment having an oscillating galvano mirror.

FIG. 2 shows a non-uniform point distribution along the horizontal direction (HFOV), e.g. due to the galvano scan mechanism. The iVFOV and VFOV scan patterns remain uniform. From an application point of view the non-uniform point density towards the edge of the window provides following advantages:

1. Increased projected point pattern for objects seen under a low angle of incidence, e.g. buildings along the road; and
2. Increased information density, e.g. detection of objects accidently crossing a street.

Figure 3A:
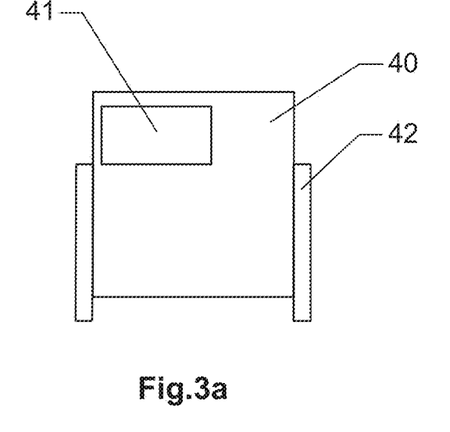
FIG. 3a-c show an exemplary embodiment of the laser scanner device according to the invention, having a common housing to house the optical components of the LiDAR module and an exit aperture which limits the theoretical achievable instantaneous horizontal field of view.
Figure 3B:
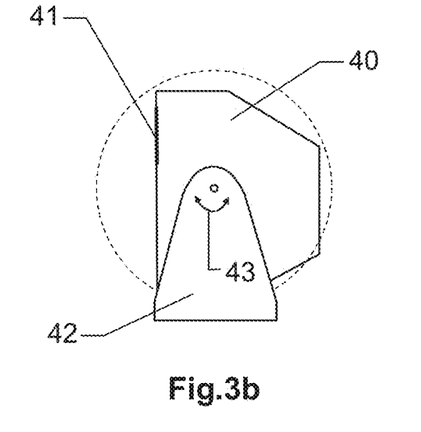
Figure 3C:
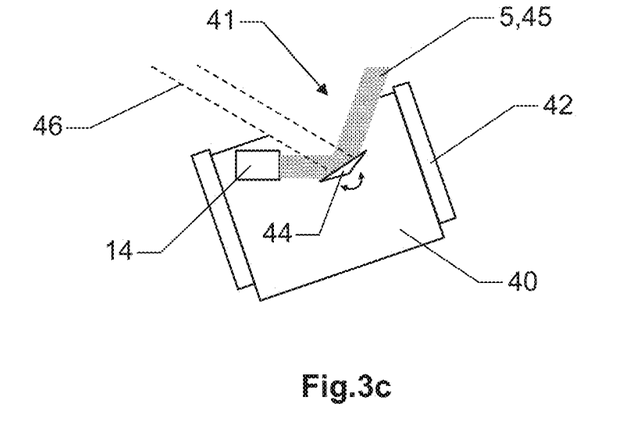

FIGS. 3a to 3c show an exemplary embodiment of the laser scanner device according to the invention in a front view (FIG. 3a), a side view (FIG. 3b), and a top view (FIG. 3c).

According to the invention, the laser scanner device comprises a common and compact housing 40 to house all the optical components of the LiDAR module, i.e. all beam steering elements. The common housing 40 has an exit aperture 41 which limits the theoretically achievable instantaneous horizontal field of view, i.e. the horizontal field of view with respect to the housing 40. In other words, the instantaneous horizontal field of view is the horizontal field of view which can be achieved by solely activating beam steering elements inside the housing to emit the plurality of measuring beams 5 out of the housing 40.

The laser scanner device may be mounted at the front of a vehicle 2 (see FIG. 1), namely in such a way that the housing 40 is in a fixed position with respect to the vehicle 2, or that the housing 40 is tiltable in vertical or horizontal direction for extending the vertical or horizontal field of view of the laser scanner device.

For example, as indicated by FIG. 3b, the housing 40 is mounted to a support 42 providing a tilt mechanism 43 for tilting the housing 40 to achieve an extended overall vertical field of view.

Figure 7:
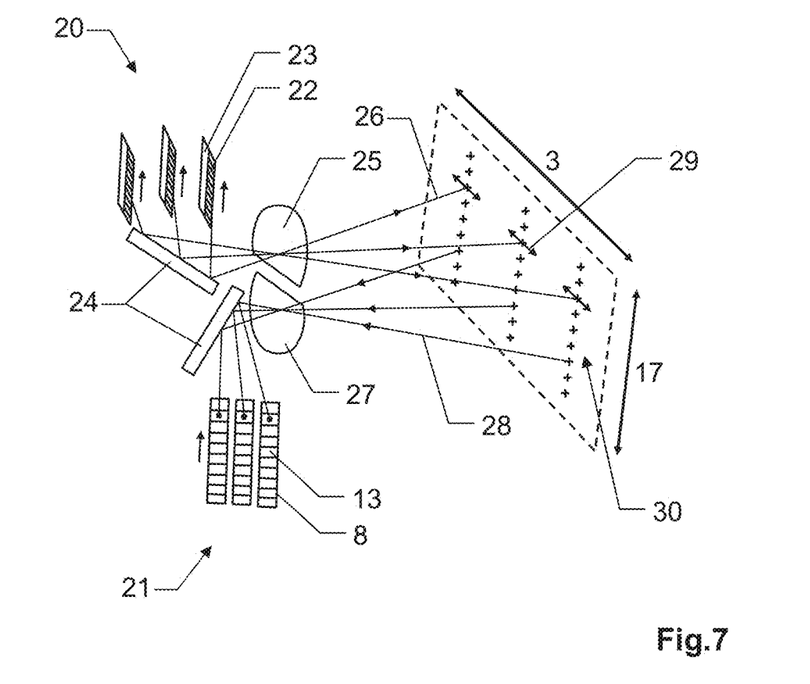
FIG. 7 schematically depicts the optical arrangement of a LiDAR module with a high integration of emitter and receiver unit.

For example, the embodiment may be based on a fast oscillating or rotating mirror element, e.g. a polygon wheel as described by FIG. 7, projecting the instantaneous vertical field of view (iVFOV), and a fixed rotating mirror 44 projecting the horizontal field of view (HFOV) with respect to the housing 40.

By way of example, FIG. 3c schematically indicates a multibeam transmitter 14 inside the housing 40, wherein the generated multiple measuring beams 5 are currently deflected to the right by a rotating mirror 44 into an end position 45 to the right wherein the multiple measuring beams 5 are not just yet limited by the exit aperture 41. Also indicated is a similar end position 46 to the left. Thus, in the figure, the exit aperture 41 effectively limits the horizontal field of view of the outgoing bundle of multiple measuring beams 5 and thereby defines the instantaneous horizontal field of view.

Figure 4:
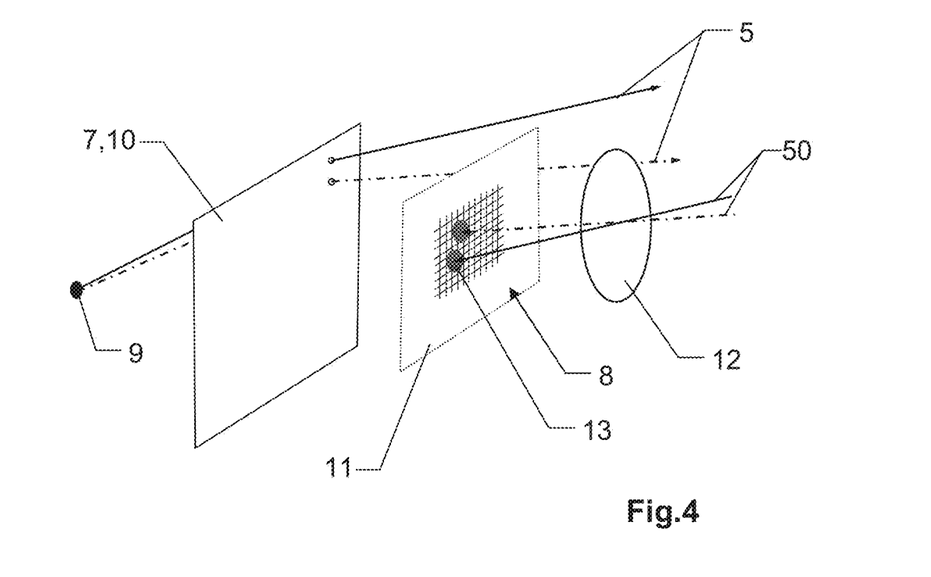
FIG. 4 schematically depicts an inventive multi-beam LiDAR module comprising a beamsplitting hologram and a SPAD-based receiver.

FIG. 4 schematically shows an inventive multi-beam LiDAR module comprising a beamsplitting hologram 7 and a SPAD-based receiver 8 being configured such that multiple sub-areas of the receiver 8 are definable which can be read out separately. In the given example, the transmitter is based on a single radiation source 9. Alternatively, the transmitter may also be based on multiple radiation sources, e.g. of different wavelength or with different modulation of emission such as, for example, known from optical telecommunication (e.g. Walsh code, Barker code, preferably short unipolar orthogonal codes).

By using holographic structures the number of radiation sources may be reduced. Because of the multiplication factor of beams projected by the hologram 7, groups of beams 5 of the same wavelength are generated. Additional differentiation between the channels may, for example, be generated by code sequences, wherein the first group of beams is linked to a first diode emitting a first code, and a second group is linked to a second diode and emitting a second code.

The figure further indicates the plane 10 of the beamsplitting hologram 7, the receiving plane 11 comprising the detector 8, and a receiving optics 12 for gathering and aligning returning beams 50 towards associated receiving areas/domains 13 of the SPAD detector 8.

For example, in such a side-by-side holographic projector and receiver multi-axial morphology the distance between the receiving plane 11 and the hologram plane 10 may be reduced to zero, wherein the receiving elements are integrated or mounted to the back of the hologram 7. A critical issue of this compact arrangement is the suppression of the optical crosstalk of the emitted to the received light. However, it is sufficient when ranging accuracy is only in the cm-range.

Figure 5:
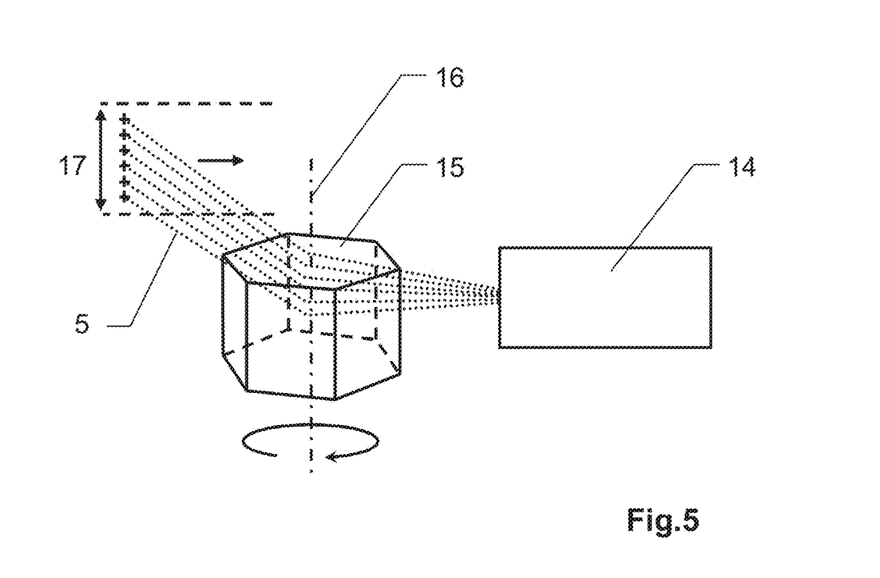
FIG. 5 schematically depicts deflecting the plurality of measuring beams in a temporally varying manner by a reflective polygon.

FIG. 5 schematically shows deflecting the plurality of measuring beams 5 from the transmitter 14 in a temporally varying manner by a deflection element, here a reflective polygon 15 rotating around a vertical rotation axis 16.

Thus, by way of example, the instantaneous vertical field of view 17 is covered by the fanned out multiple measuring beams 5, whereas scanning in horizontal direction is achieved by means of the fast rotating polygon prism 15.

In order to achieve a scan resolution of at least one point per 0.8° in horizontal and vertical direction, the individual laser beams nearly touch each other. In any case, if higher resolutions as one point per 0.1° are used, the neighbouring beams start to overlap. Therefore, reducing optical cross talk between the beams, particularly neighbouring beams, is particularly necessary. Optical cross-talk may be reduced by using for the beams different wavelengths and/or polarization states, and/or by using signal codings by modulation of the burst sequences, e.g. based on Barker pulses.

Figure 6:
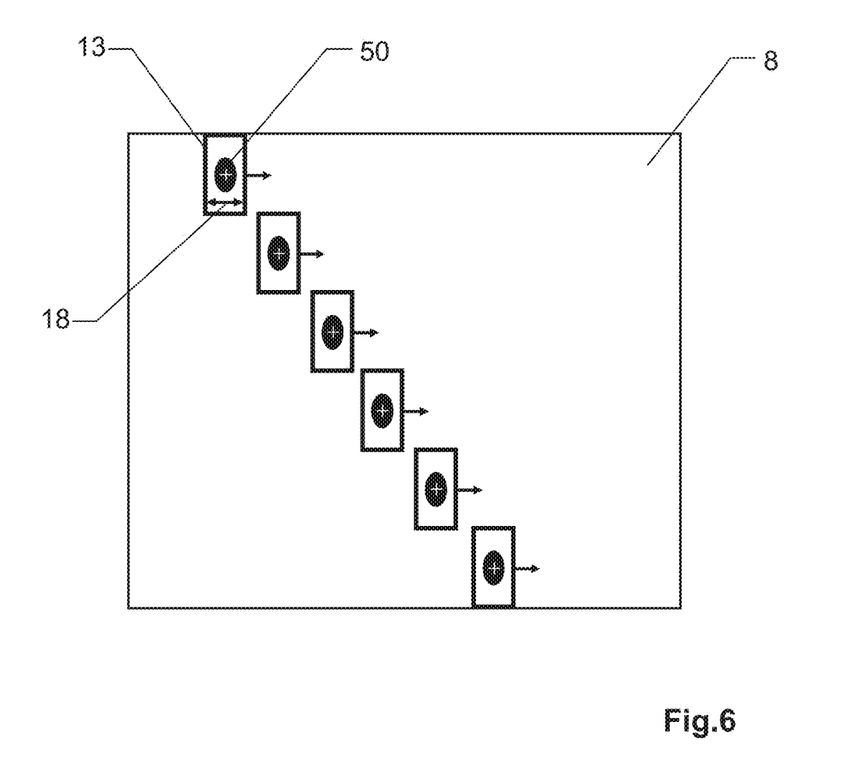
FIG. 6 schematically depicts the adjustment of domains of a SPAD array to match the selected alignment/shape of the individual beams.

FIG. 6 schematically shows a temporally varying definition of sub-areas 13 on a SPAD array detector 7 to match the alignment/shape of individual returning beams 50 of the plurality of measuring beams.

By way of example, the plurality of measuring beams may be generated as shown by FIG. 5, i.e. a fan of essentially instantaneously generated beams lying in a vertical plane, the fan of beams covering the instantaneous vertical field of view 17 whereas scanning in horizontal direction is achieved by means of a fast rotating polygon prism 15. In FIG. 6 the horizontal direction corresponds to the horizontal scanning direction shown by FIG. 5.

Thus, the sub-areas 13 are defined such that each sub-area corresponding to one returning beam 50 moves horizontally over the SPAD array detector 7, similar to a so-called "rolling shutter" principle. Such a definition of multiple horizontally "rolling" sub-areas 13 may be implemented by simplified drive electronics, wherein the width 18 and/or height may be adjusted to match the actual beam diameter of the returning beam 50, e.g. based on a lookup table correlating a beam shape or light spot dimensions with a distance.

According to the invention, the beams of the plurality of measuring beams are generated in such a way that they define a plurality of essentially instantaneous scanning axes. In other words, individual pulses of different beams are generated "essentially at the same time", i.e. in a time synchronized fashion but not necessarily exactly at the same time. Typically the individual pulses are sent out having a small temporally offset to pulses of neighboring beams, e.g. to minimize cross-talk effects. Therefore, in the figure the respective sub-areas 13 are slightly shifted too with respect to each other.

FIG. 7 schematically shows an all solid state scanner with arrays of emitters 20 and receivers 21. This compact multibeam scanner comprises a highly integrated emitter unit consisting of at least two laser diode arrays in a vertical orientation each, and each comprising a laser bar 22 at the front side and driver electronics 23 at the back side. The laser bar 22 consists of individual laser diode units and each of them emits radiation against a deflecting mirror 24, wherein the driver electronics 23 controls the individual laser emission. When staking at least two laser bars a 2D-emitter array can be realized. A single transmitting objective 25 serves for collimation of all laser beams 26 to the scene to be mapped.

The receiver array 21 is arranged in a comparable way to the emitter array 20, namely a single objective 27 serves for the collimation of the reflected light 28 to assigned extended detector elements 13, e.g. SPAD arrays 8 with vertically moving domains 13 synchronously activated to the emission pattern of the laser diode bars 22.

Fast vertical scan operation is achieved by activating the filaments inside the laser bars 22 in a serial manner. The activated domains 13 of the receiver arrays 8 are synchronously shifted to the corresponding activated laser bars 22 such that the radiation is collected by the sensitive areas 13. The horizontal scan movement 29 is a combination of synchronisation between the activation of the laser bars 22 and the tilting mirrors 24, e.g. based on MOEMS technology. Many different modes of scan patterns can be realised by this two-stage actuators.

For example, every laser bar 22 may generate a vertical scan line 30 at a first position of the MOEMS deflection unit 24. The deflection unit 24 then changes the beam angle by a point density interval, e.g. 0.2°, and every laser bar 22 then generates the next vertical scan line 30, and so on.

By way of another example, the MOEMS deflection unit 24 oscillates periodically in horizontal direction while the laser bars 22 generate vertical virtual scan movements.

Although the invention is illustrated above, partly with reference to some preferred embodiments, it must be understood that numerous modifications and combinations of different features of the embodiments can be made. All of these modifications lie within the scope of the appended claims.

What is claimed is:

1. A system comprising a set of laser scanner devices, each of the laser scanner devices being adapted to be mounted to a vehicle, the device comprising:
a LiDAR module working based on a laser measuring beam and time-of-flight-measurement-principle using waveform digitizing, wherein all optical components of the LiDAR module are arranged inside a common housing,
wherein:
the LiDAR module comprises a multibeam transmitter configured to instantaneously generate a plurality of individual measuring beams next to each other, thereby defining a plurality of essentially instantaneous scanning axes, wherein the plurality of measuring beams are generated such that within the plurality of measuring beams each measuring beam is identifiable by a corresponding beam identifier based on a pulse coding,
the LiDAR module comprises a receiver embodied as multipixel photon counter, MPPC, wherein the MPPC comprises an array of single photon avalanche photodiodes, SPADs, arranged as a matrix structure on a chip, wherein SPADs are connected in parallel into different cell groups and the MPPC is configured to detect in parallel returning parts of each of the measuring beams of the plurality of individual measuring beams as back radiation, wherein the lidar module is configured to determine a set of return signals based on the back radiation, each return signal of the set of return signals corresponding to a different measuring beam of the plurality of individual measuring beams,
the common housing has an exit aperture, wherein:
the exit aperture is common to all measuring beams, and
the exit aperture limits the theoretically achievable instantaneous horizontal field of view of the laser scanner device with respect to the housing, to less than 180°,
wherein:
the LiDAR module is configured to provide:
a horizontal field of view of at least 60°,
an instantaneous vertical field of view provided by the instantaneously generated plurality of individual measuring beams of at least±2°,
a scan resolution of at least one point per 0.8° in horizontal and vertical direction, and
a frame rate of at least 10 Hz for scanning at least the entire horizontal and instantaneous vertical field of view with said scan resolution,
wherein the plurality of measuring beams are generated such that within the plurality of measuring beams each measuring beam is identifiable by the corresponding beam identifier based on the pulse coding, wherein at least two beams of the plurality of measuring beams have orthogonal pulse codings,
wherein the transmitter comprises a radiation source, the radiation source being a 2D emitter array comprising multiple staked bars of laser diodes, wherein each of the bars of laser diodes is embodied as an array of laser diodes on a bar-like semiconductor substrate, wherein emission points are aligned in a line, and the emitter array is configured to provide selectively controllable laser diodes,
wherein the LiDAR module comprises a computing unit and the computing unit and the receiver are configured that different sub-areas of the receiver are set by the computing unit in such a way that returning parts of different measuring beams in each case are read out by different sub-areas of the receiver, based on angle and/or distance data corresponding to individual measuring beams of the plurality of measuring beams, wherein the computing unit is configured to control the LiDAR module based on a pre-programmed measuring process to drive the emission and/or the deflecting of the plurality of measuring beams and the setting of sub-areas of the receiver, wherein the setting of sub-areas is synchronized with the emission and/or the deflecting of the plurality of measuring beams, such that the individual SPADs are grouped so as to match a selected alignment and shape of the individual measuring beams of the plurality of measuring beams,
and wherein
each laser scanner device is configured that its plurality of measuring beams is identifiable as a group having a common group identifier based on at least one of:
a common group wavelength or a range of wavelengths assigned to the group,
a common polarization state of the group or a range of polarization states assigned to the group, and
a common pulse coding for the group or a range of pulse codings assigned to the group,
the common group identifiers of the different laser scanner devices differ from each other such that each laser scanner device has an associated unique identifier such that each of the laser scanner devices can unambiguously identify its own measuring beams.

2. The system comprising the set of laser scanner devices according to claim 1, wherein the transmitter comprises:
a multibeam generator for generating the plurality of measuring beams based on radiation emitted by the radiation source.

3. The system comprising the set of laser scanner devices according to claim 2, wherein the multibeam generator is configured such that the plurality of measuring beams are generated to form substantially instantaneous 2D scan pattern.

4. The system comprising the set of laser scanner devices of claim 2, wherein the multibeam generator for generating the plurality of measuring beams based on radiation emitted by the radiation source is based on at least one of:
a holographic structure,
a liquid crystal spatial modulator, or
an optical phased array.

5. The system comprising the set of laser scanner devices according to claim 1, wherein the plurality of measuring beams are generated such that within the plurality of measuring beams each measuring beam is identifiable by the corresponding beam identifier based on
beam wavelength and/or
the polarization state of the beam.

6. The system comprising the set of laser scanner devices according to claim 1, wherein the plurality of measuring beams are generated such that its beams are identifiable as a group having a common group identifier based on at least one of:
- a common group wavelength or a range of wavelengths assigned to the group,
- a common polarization state of the group or a range of polarization states assigned to the group, and
- a common pulse coding for the group or a range of pulse codings assigned to the group.

7. The system comprising the set of laser scanner devices according to claim 1, wherein the LiDAR module is configured for deflecting the plurality of measuring beams emitted by the transmitter in a temporally varying manner, wherein the LiDAR module comprises at least one of:
- a horizontal deflecting unit configured for steering the plurality of measuring beams horizontally, based on at least one of a rotating mirror, a microelectromechanical system, or a Galvano for deflecting the plurality of measuring beams in a uniform manner, and
- a vertical deflecting unit configured for steering the plurality of measuring beams vertically in the instantaneous vertical field of view, based on at least one of a polygon prism, a mirror, or a microelectromechanical system.

8. The system comprising the set of laser scanner devices of claim 1, comprising a tilt mechanism for tilting the LiDAR module to achieve an extended overall vertical field of view of at least±25°.

9. The system comprising the set of laser scanner devices according to claim 1, wherein:
- the LiDAR module is configured to set at least a first and a second scan pattern based on the plurality of measuring beams,
- the second scan pattern is different from the first scan pattern, and
- the LiDAR module is configured to alternate between the first and the second scan pattern based on at least one of the speed of the vehicle and directional information of the vehicle,
- wherein the directional information comprises at least one of:
  - a position of a steering wheel of the vehicle, particularly a sequence of steering wheel positions,
  - a vehicle path determined by GPS localization, and
  - a vehicle orientation and/or a vehicle orientation change determined by an inertial measuring unit.

10. The system comprising the set of laser scanner devices according to claim 9, wherein the first and the second scan pattern differ from each other by at least one of:
- a different laser power distribution within the beams,
- a different number of beams,
- a different projected beam density,
- a different projected beam distribution,
- a different beam spacing,
- a different emission timing, and
- different individual beam shapes.

11. The system comprising the set of laser scanner devices according to claim 9, wherein the LiDAR module is configured to alternate between the first and the second scan pattern based on a current global position of the vehicle.

12. The system comprising the set of laser scanner devices of claim 1, wherein at least one of the following:
- the plurality of measuring beams are pulsed laser beams;
- the exit aperture is also the entrance aperture of a receiving optical channel for detecting the back radiation; or
- the exit aperture is a rectangular opening in a planar outer surface of the housing.

13. The system according to claim 1, wherein different laser scanner devices of the set of laser scanner devises are configured to be mounted to different vehicles.

14. The system according to claim 13, wherein the system comprising a plurality of vehicles wherein each vehicle is equipped with at least one laser scanner device of the set of laser scanner devices, and the system is configured to provide that each vehicle can unambiguously identify laser beams of its laser scanning device.

15. The system according to claim 14, wherein at least one of the vehicles is an autonomously driving vehicle.

16. The system according to claim 15, wherein the LiDAR module is embodied as a forward-looking LiDAR module.

* * * * *